(12) United States Patent
Tuchman et al.

(10) Patent No.: US 8,275,747 B2
(45) Date of Patent: Sep. 25, 2012

(54) AUTOMATED UNIT FINDING FOR NUMERIC INFORMATION RETRIEVAL

(75) Inventors: Ari K. Tuchman, Palo Alto, CA (US); John K. Stockton, Menlo Park, CA (US)

(73) Assignee: Quantifind, Inc., Palo Alto, CA (US)

( * ) Notice: Subject to any disclaimer, the term of this patent is extended or adjusted under 35 U.S.C. 154(b) by 290 days.

(21) Appl. No.: 12/754,249

(22) Filed: Apr. 5, 2010

(65) Prior Publication Data

US 2011/0246458 A1 Oct. 6, 2011

(51) Int. Cl.
*G06F 17/00* (2006.01)
(52) U.S. Cl. ........ 707/640; 707/609; 707/791; 707/802; 707/821
(58) Field of Classification Search ........... 707/800–899
See application file for complete search history.

(56) References Cited

U.S. PATENT DOCUMENTS

2008/0140639 A1* 6/2008 Doerre et al. ............ 707/4
* cited by examiner

*Primary Examiner* — Isaac M Woo
(74) *Attorney, Agent, or Firm* — Chadbourne & Parke LLP

(57) ABSTRACT

The present invention is related to the task of retrieving numeric information in response to a textual keyword-based query by automatically associating a unit to the type of data being retrieved. An information retrieval system is presented which suggests a unit for data exploration by leveraging the local environment of numeric data across the corpus. This local environment is parsed, including through natural language processing and proximity-based techniques, to determine units relevant to particular keyword phrases. The system also relies on knowledge of semantically and scientifically related units to optimize their binning for suggested unit scoring.

22 Claims, 3 Drawing Sheets

AUTOMATED UNIT FINDING FOR NUMERIC INFORMATION RETRIEVAL

BACKGROUND OF INVENTION

Information retrieval for numeric data, particularly from unstructured content sources, presents special challenges to search engines. Many of those challenges are described and addressed in our co-pending U.S. patent application Ser. No. 12/496,199, System and Methods for Units-Based Numeric Information Retrieval, incorporated herein by this reference (hereinafter referred to as the "Co-Pending patent"). Due to the prominence of generic keyword based document retrieval and search engines, users have been trained to input query keywords and retrieve documents after entering only a keyword phrase and no additional contextualization information. Thus, the type of data sought in a query—such as the relevant unit of data—may not be specified by a typical user. For applications where a user seeks information from a corpus containing numeric data but has not specified a relevant unit of data of interest, there is a need for an information retrieval system that can automatically determine this unit.

Therefore a system which can automatically determine the appropriate unit to be associated with numeric data being searched and retrieved in response to a simple keyword-only query (i.e., with no explicitly identified unit of data, and preferably even with no numbers being specified), without requiring the user to provide any additional contextualization, is of great value and importance.

BRIEF SUMMARY OF THE INVENTION

Aspects of the present invention include computer-based methods to automatically retrieve numeric information from a set of electronic source documents. An electronic query is received comprising one or more keywords from a remote user computer system via a telecommunications network. An appropriate unit of measure to further refine or contextualize the keyword query is automatically determined, at least in part by identifying related occurrences within the electronic source documents of the query keyword(s) and one or more units of measure. The related occurrences are identified with the aid of a computer-searchable index which comprises a plurality of searchable index entries; at least a plurality of the index entries include a representation of an associated unit of measure (and, in some embodiments, a numerical value) extracted from the electronic source documents. The relevance of the index entries to the electronic query is then assessed, at least partly based on comparing the automatically determined query unit against the unit associated with each of the index entries.

In further aspects, automatically determining the query unit preferably includes scoring the related occurrences to reflect how closely related the keyword and the unit appear to be within the electronic source document, such as by means of natural language processing techniques and/or by measuring the proximity between the keyword and the unit within text of the source document. The scores assigned respectively to each of the related occurrences can then be aggregated for each unit of measure.

In further aspects, the electronic query may include one or more document-level keyword constraints. Document-level keywords may be used to filter eligible electronic source documents, but proximity of the document-level keyword and a unit of measure within the source document are not relevant in determining the query unit.

Still further aspects include displaying graphical output based on the assessed relevance of the index entries to the electronic query, preferably including an interactive facility listing one or more suggested query units and/or suggested facets, and allowing a user to select among the suggested query units and/or facets to refine the query. A look-up table may be provided to augment system performance by storing rules (manually hardcoded, and/or determined automatically through use of the system) associating particular units with particular facets or keywords, and/or associating forms of expressing equivalent or related units.

The invention may also be embodied in computer-based apparatus, such as a system of computers in communication with each other via a telecommunications network and being collectively programmed to perform methods for numeric information retrieval as described above.

DETAILED DESCRIPTION OF THE INVENTION

Figure 1:
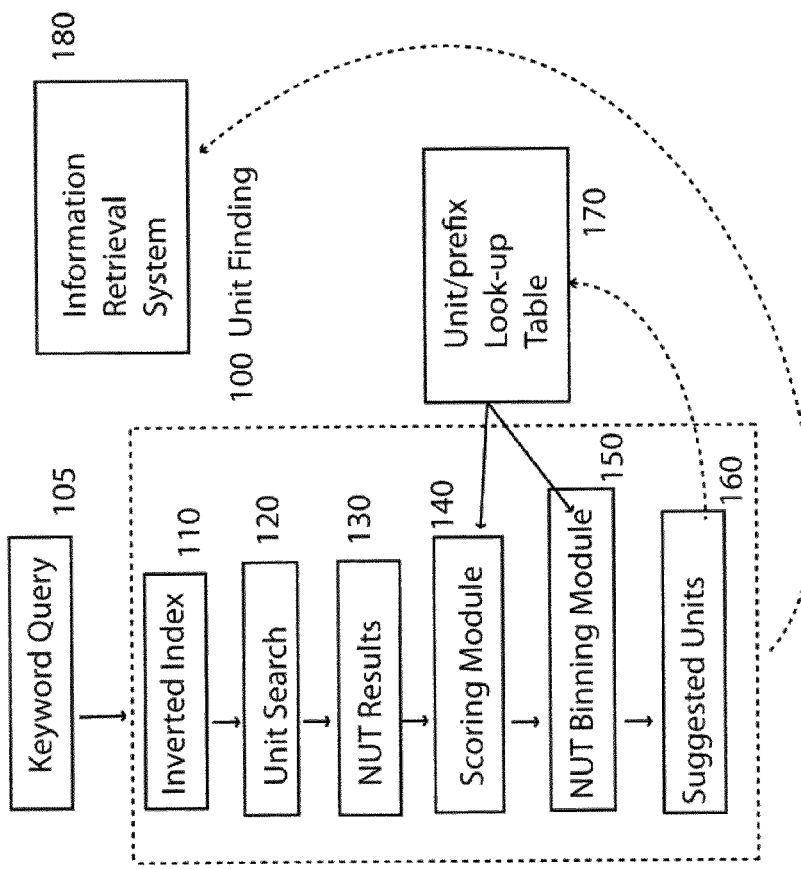
FIG. 1 is a schematic of a Unit Finding System in accordance with the present invention which determines an optimum unit or units for exploring data associated with an input keyword query.
Figure 2:
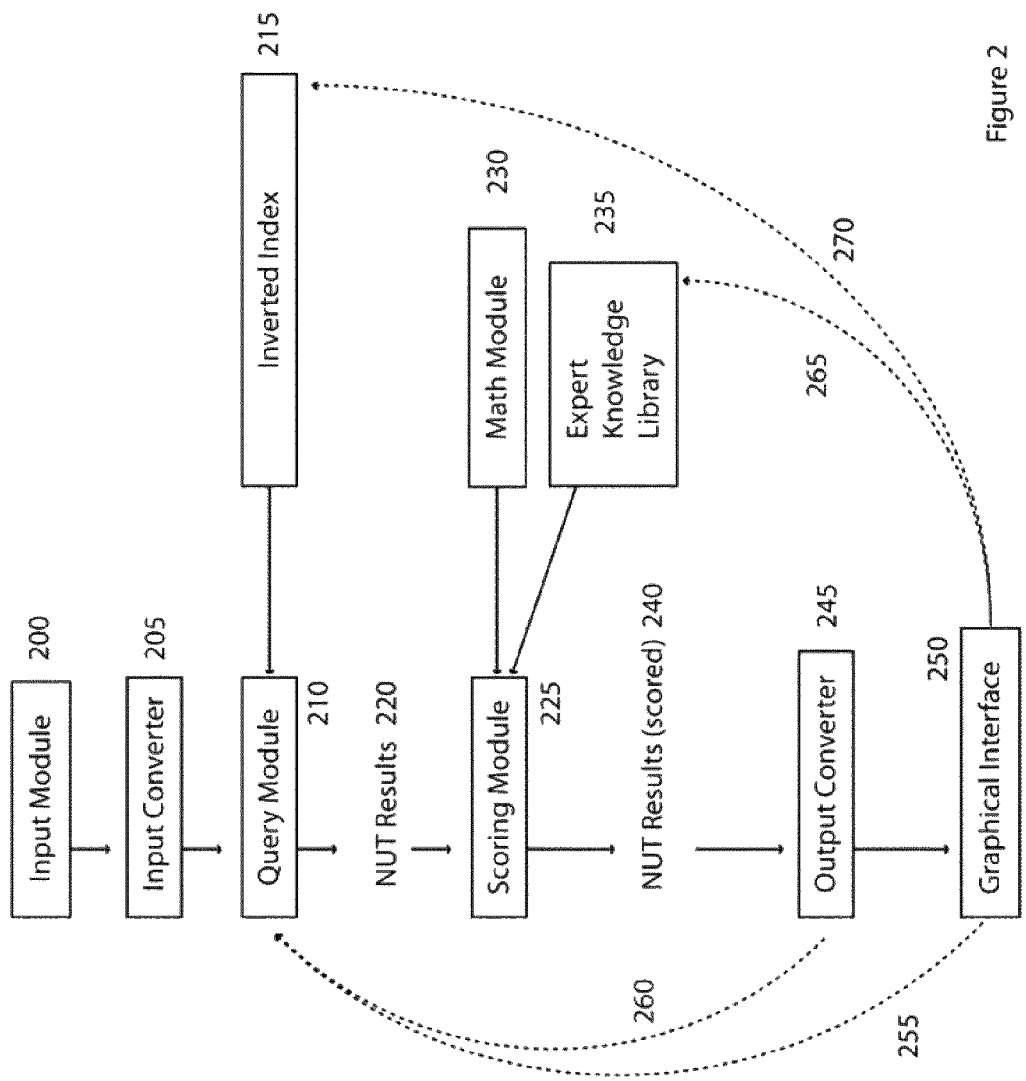
FIG. 2 is a schematic of an exemplary Units-Based Numeric Information Retrieval System for use in conjunction with a Unit Finding System of the present invention.

The present invention will now be illustrated in accordance with various exemplary embodiments. In one embodiment, the invention can be employed advantageously in conjunction with a units-based numeric information retrieval system such as for example described in the Co-Pending patent. FIG. 2 of the Co-Pending patent is reproduced here for convenience of reference. With reference to FIG. 2, if a user query provided to query module 210 contains no specified unit of measure, then in accordance with the present invention, query module 210 can submit the query as input (keyword query 105) to unit finding system 100. Unit Finding System 100 parses textual keyword query 105 and automatically identifies one or more suggested relevant units 160 (as will be described in detail below) to focus the desired search, even when the user has not specified a unit. Suggested units 160 are returned to query module 210 of Information Retrieval System 180 to perform a units-based search, where Information Retrieval System 180 may preferably be implemented as blocks 210-270 described in the Co-Pending patent. In an exemplary embodiment, Inverted Index 215 and 110 can be the same.

For example, if a user enters query keywords "Pentium," Unit Finding System 100 would analyze aspects of the corpus of documents being searched (by means of the techniques described below) and automatically identify one or more relevant units such as "Hertz" (corresponding to clock rate), in order to better focus the search performed by Information Retrieval System 180.

Advantageously, the user thus need not even know in advance which units of numeric data may be relevant to his search.

1. Unit Retrieval

To parse received query 105, Unit Finding system 100 leverages Inverted Index 110, which in an exemplary embodiment is implemented in the manner of inverted index 215 in the Co-Pending patent. (However the present invention is not limited to these or other features of the Co-Pending patent.) Briefly, in a preferred embodiment, during the course of index building for the corpus of source documents to be searched, every number occurring in a source document is paired with a unit, either semantic or scientific, that is found to occur proximately in the document. Scientific units include meters, seconds, kg, etc., and semantic units could include any countable noun, such as airplanes and barrels. These number/unit pairs, exemplified in the Co-Pending patent as Number Unit Tuples ("NUT"), are stored as entries in inverted index 110 and associated with an identifier for retrieving the particular source document from which each NUT was extracted. Each NUT can also be reduced or flattened, such as where, for example, meters, inches, and miles are stored in a way indicating that they share an underlying base unit, in this case indicative of length. The original form of the unit expressed in the document can be stored as well.

In addition, Unit Finding System 100 also has access to a searchable index of the occurrence and position of all textual keywords within each of the source documents. This might be included within Inverted Index 110, as described for example in the Co-Pending patent.

To be clear, the present invention is not limited to a particular implementation of Inverted Index 110 or to any particular NUT formats. For example, in some embodiments, Inverted Index 110 might be constructed and stored in its entirety in advance; whereas in other embodiments the number/unit associations might be derived (perhaps in part) on-the-fly as needed at search-time. As practitioners will recognize, numerous formats and structure are also possible for the indexing of number/unit pairs and of document keywords.

In the exemplary embodiment, Unit Finding System 100 automatically determines which NUTS in Inverted Index 110 are semantically and contextually related to the keywords in query 105, in the process now described. First, Unit Search Module 120 locates all instances of query keywords 105 within the corpus of source documents, and identifies all of the NUTs 130 that occur proximate to the keywords. Proximity can be measured, for example, by the number of intervening terms; see below for more details regarding computation of "span" by Scoring Module 140. The threshold for proximity can be set optimally based on corpus size. For example, for a relatively small corpus, a larger maximum distance than for a large corpus is typically preferable, in order to allow sufficient recall to identify relevant units. In general, the proximity threshold should generally be set high enough so as to allow sufficient recall to reliably determine the optimum units, but not so large as to impair the unit finding process from working efficiently and accurately. Experimentation with the particular corpus of interest to the practitioner may be helpful in this regard since the optimization results will likely vary depending on the particular corpus used for training the algorithm. As will be further discussed, all resulting NUTs 130 found within this chosen proximity threshold are analyzed and scored by Scoring Module 140 and then binned 150 based on their unit, without regard (in this exemplary embodiment) to their numeric value. Thus, once a NUT is identified by Unit Search Module 120 as being located in close proximity to query keywords 105, preferably the NUT is effectively processed only to evaluate its unit.

In order to avoid having a single document overly contribute to and bias the unit finding process, limits can be placed on how many NUTs to score from each document.

2. NUT Scoring

After NUTs 130 are returned, Scoring Module 140 quantifies the relevancy of each one and thereby determines which unit is most highly representative as a relevant data constraint for the present query. There are multiple scoring algorithms based on the local environment in which each retrieved NUT appears which can be used to identify the most relevant units for which to extract relevant data. Thus, these scoring algorithms are preferably used to determine the most salient unit with which to constrain the search; Information Retrieval System 180 may subsequently use other algorithms to determine the relevancy of a particular data point to the query.

One potential embodiment of the Scoring Module is to impose a linear weighting based on the spatial separation of terms between the NUT retrieved by the Unit Search Module 220 and the keyword of query 105. The score of each NUT can be set, for example, to be inversely dependent on the distance between the found keyword and the NUT.

An alternate scoring algorithm preformed by the Scoring Module 230 is to score the inverse distance dependence according to a higher-order power law dependence. For example, each NUT x(i) can be scored as:

$$\text{Unit Score } x_i = \frac{1}{(\text{distance}_i)^p} \quad (1)$$

in which p is a variational parameter. Parameter p can be optimized for a given corpus size: thus, for a large corpus p would tend to be larger than in a small corpus size. Furthermore, p is preferably optimized over training data.

The basic scoring equation described above to be implemented by Scoring Module 140 for individual NUTS can be augmented with several natural language processing ("NLP") related techniques. These NLP techniques can be used to intelligently reduce or increase the effective distance between the keyword and unit. This effective distance calculated using NLP techniques is denoted as "span." Thus when NLP techniques confidently associate certain words with a NUT, the span between the two will be made smaller than the raw distance, indicating a stronger association.

The span can incorporate several factors. In one embodiment of the span calculation, punctuation present between the query keywords and the nearest NUT can be recognized and leveraged. For example, the presence of a "period" or "semicolon" separating the NUT from the keyword would reduce its score, effectively treating the query keywords and NUT as if they had been spatially separated by more terms. In addition, various keyword "stop words" can be overweighted to increase the effective span used in scoring. For example conjunction words between a NUT and a keyword would preferably reduce the relevancy of the NUT to the keyword. In addition, specific modifying phrases such as those beginning with "that" or "which" can indicate preferred association of the subject preceding and the NUT following. For example, in the sentence, "The laser pulse duration, which was optimized for the surgery, was 20 ms," the independent clause "which was optimized for the surgery" could be recognized using NLP techniques to reduce the effective distance between "laser pulse duration" and "20 ms."

In addition, if a NUT is in close proximity to a keyword but is in closer proximity to a different noun, then NLP techniques can preferably be used to determine if the NUT is preferentially associated with the other noun and not the keywords that were entered into the Query Module. Similarly, if NUT1 is separated from the query keywords by another NUT2, then NUT1 can be given a reduced score by adding an offset to its span. In addition, if a NUT is in close proximity to the keyword phrase located within the metadata of a document then that association may be more valuable than if the close proximity were found in the body of the document. Each of these local environment factors can be used to adjust the effective span used in a scoring equation such as Equation 1, or can be used as a component in an alternate scoring algorithm.

In another embodiment, the numeric distribution of the values of the NUTs closely associated with the query keywords can be used to determine the most salient unit. For example, if the results for one unit are tightly clustered around a peak value and the results for other NUTs are randomly distributed, the unit corresponding to the NUTs that are clustered might be more relevant. We will discuss in the Facet Finding section below how these clusters, which are visualized by first determining the salient unit, can be leveraged to extract distinctive keywords or facets common to the data in each cluster.

3. Binning

The individual scored NUTs are next aggregated based on their underlying units by Binning Module 150 to determine the optimum unit for information retrieval for the given query over the entire corpus. This process determines which units can be combined by recognizing relationships between different units. Thereby, aggregate information of all numeric data contained in the corpus contributes to unit finding for a particular query. For identical instances of a unit the binning reduces to a simple sum of like terms. For example, NUTs with associated unit "meter" are summed up to determine the aggregate score for the unit "meter." In this embodiment, Binning Module 150 simply adds the scores for each retrieved instance of an identical unit to give the final score for that unit as shown in Equation 2, but possibly using the calculated span rather than the raw distance.

$$\text{Unit Score}_x = \sum_i \text{Unit Score } x_i \qquad (2)$$

In another embodiment, units such as "meters" and "inches" and other related length scales will be converted into a base unit of length and scored together. For each base unit, a default choice is made by Binning Module 150, such as "meters" as the default base unit for all length-oriented units. This aggregation of related units requires some hard-coded ontologies to accurately enable Binning Module 150 to understand these relations. These can be stored in Unit/Prefix Look-up Table 170. However, the mathematical conversions between, for example, inches and meters need not be hard-coded at this stage, since the Binning Module is not necessarily parsing the numeric value of the NUT Results 160. Rather, this implementation of unit flattening and binning simply requires knowledge of scientific prefixes such as nano or kilo, which can be stored in Look-up Table 170.

Additional hard-coded binning ontologies can be applied as well by Binning Module 150, even those that may not have been implemented into Index 110. For example RPM could be treated as a stand-alone unit or can be flattened with degrees per hour. MPG (distance/volume) should most likely not be reduced to 1/area, but should be flattened with km per liter. However, in certain contexts "meters/m^3" might be flattened to "1/m^2."

Often, units might be scientifically related but are not semantically related, and therefore the user may not want to conflate two units in Binning Module 150, even though the NUT values may be scientifically comparable. For example, although "light-year" and "nm" both refer to length scales, it is unlikely that they refer to the same contextual topic. Therefore, in some embodiments Binning Module 150 will preferably not aggregate these two units although they share a base unit. Units can be determined to be flattened together based on relationships provided by the Look-up Table 170. The relationships stored in the Table can be determined automatically and/or can be specified manually.

Those unit relationships that are determined from the corpus and then stored by Look-up Table 170 are most efficiently determined before search time. For example, the distribution of numeric values of all NUTs with a given unit can be compared with the distributions of other units. The numeric values of one unit must be converted to the scientifically related forms for this comparison. Then, for example, if the corpus distribution of data referring to MPG is similar to Km per liter, these units can be stored as being related in the Look-up Table 170 and subsequently combined in Binning Module 150. Data distribution similarity can be determined in multiple ways such as by calculating overlap integrals between the distributions.

In another embodiment of the invention, binning can also be scored by scaling or normalizing each base unit's score based on the number of NUTs contributing to that score. Thus, in this embodiment, if a NUT shows up frequently associated with the query keywords but in a construction that always implies only a loose association as determined by NLP and separation, then it will not be scored highly as a suggested unit; conversely, a unit that occurs infrequently but with high keyword association will be preferentially returned. An example of a simple normalization is to divide the sum by N for each base unit, where N is the total number of NUTs contributing to that unit score.

Once the highest scoring base unit is identified by binning module 150, this unit is combined with keyword query 105 in order to better constrain the data search. In one embodiment, Information Retrieval System 180 will then subsequently search for all data references with any unit related to the chosen base-unit and also matching the keyword(s).

Alternatively, the most frequent or highest scoring form of that base unit representation can be chosen to modify the keyword constraint, without searching for related units as well. All the NUTs that were identified as units in the subset of the base unit selected to constrain the query can be subsequently rescored, but this time using their exact form of expression in the natural text. In this embodiment, the binning can be viewed as a multi-step process. First, the binning is performed by combining all related units that can be reduced to a common unit. This subset can then be rescored such that results from a smaller subset of units are binned together. For example, first all length scale units can be binned together and e.g. "meter" is determined to be the suggested unit. Next the data with "meter" as a base unit can be re-binned, but this time only metric length scales might be binned together and scored separately from other units. A final step might be to only bin exactly alike units, such that nanometers and microns would be binned separately. With this method, the generic base unit for the keyword can be identified as well as the most common form of the base unit.

Sample Optimization

We illustrate a sample parameter optimization by examining the precision of Unit Finding System 100 as a function of p, where p determines the scaling in Scoring Module 140 of the inverse dependence of unit score with separation between the NUT and the query keywords as in Equation 1. We can measure this precision, for example, by comparing the unit suggested by Unit Finding System 100 to that suggested based on a standard list which associates scientific units with keywords. For example, the United States National Institute of Standards and Time (NIST) provides a list of such associations. In our experiments and for our corpus of selected United States patents, we determined p=4 to be the optimum parameter value; however, each practitioner should preferably conduct this optimization independently based on his or her relevant corpus of documents and data.

4. Multiple Units

The output from Binning Module 150 provides multiple suggested units 160. For example, if a search for "Solar Cell" is entered into the Query Module, the Unit Finding system 200 might suggest units of "%," denoting cell efficiency, "$," denoting price, and "mA/cm" denoting current density. The determination of the property denoted by the found unit, such as "cell efficiency" denoted by "%", is discussed in the Facet Finding section below. This keyword property is defined as the "facet", and together with the unit may be more semantically descriptive than the unit alone.

In one embodiment, it may be sufficient to return the top-scored unit to Information Retrieval System 180, to further constrain keyword query 105. In addition, however, more than one of the suggested units 160 may advantageously be returned to Information Retrieval System 180, as will shortly be discussed.

Figure 3:
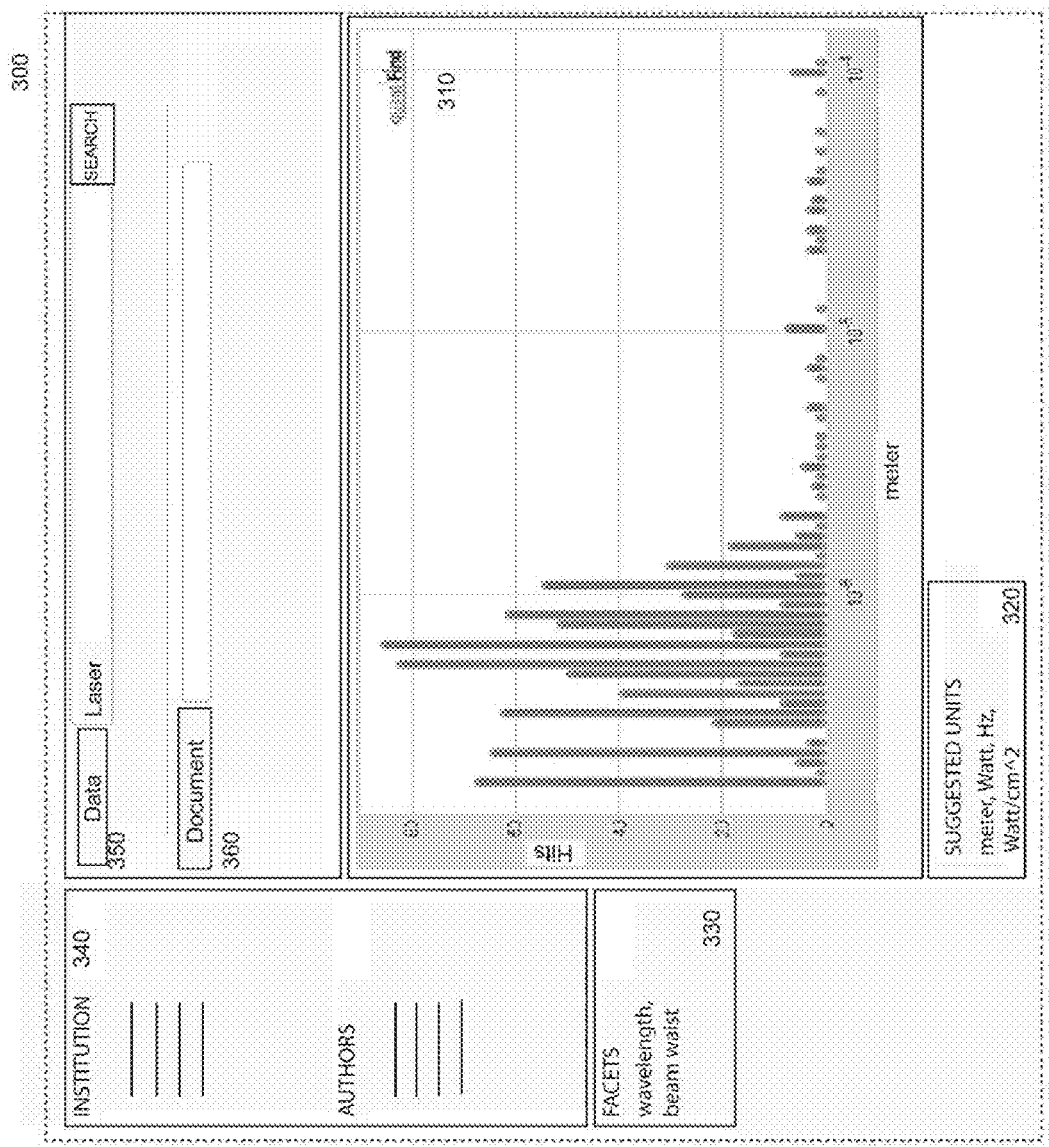
FIG. 3 is an illustration of an embodiment of a graphical interface.

The top-scored unit is preferably used by Graphical Interface 250 of Information Retrieval System 180 to plot in aggregate all of the data retrieved. FIG. 3 is a screen shot depicting aspects of Graphical Interface 250 in one embodiment 300, in which the found unit is chosen as the unit axis label for graph 310. In this embodiment, the top-scored unit becomes the x-axis unit label for the data displayed in the plot section 310 of Graphical Interface 300. This x-axis unit label could either be the top-scored unit in its base unit form, or could be the exact form of unit expression most highly scored within the corpus for a given base unit.

In further embodiments, Graphical Interface 250 (300) of Information Retrieval System 180 can list the next several highest scoring units on the output screen. A multiple unit suggestion list 320, based on Suggested Units 160, thus endows Graphical Interface 300 with enhanced exploratory capabilities, even if only data with one unit is plotted. Preferably, users can use Graphical Interface 300 to interactively select a different unit from the suggested list 320 to constrain keyword query 105 and observe the results. The query can also be further narrowed by clicking on a specific author, institution or other possible metadata 340, to redo the search, at which time the unit finding stage 120 can be performed again with the new metadata constraint, or alternatively the previously found unit can be assumed for the new, more constrained search. The plot space 310 can also have zoom features by which the user constrains the search to the numerical region selected. After this user action, the unit finding stage 120 can be performed again within this numeric range to determine the most common form of the previously found base unit.

In other embodiments, a plurality of suggested units 160 are each used by Information Retrieval System 180 to respectively constrain keyword query 105, and the corresponding data sets retrieved can be plotted against each other by Graphical Interface 250 where each unit is used as the label along one plotting axis. This mode will enable correlations between different properties of a device to be visualized.

5. Document Constraints

If the received keyword query 105 is not intended to constrain the data itself but rather to constrain the document set, such as to retrieve all numerical data from any document containing a specific keyword phrase, then in one embodiment Scoring Module 140 preferably does not calculate a distance scoring such as in equation 1. Rather, it tallies the incidences of all NUTs within those documents containing the keyword phrases which are found by Unit Search Module 120. In this instance all NUTs within those documents can be scored equally, or alternatively, select NUTs (such as those appearing in document metadata) can be more highly scored. In one implementation of this embodiment the keyword phrase can be identified as a document constraint by being entered by the user in the Document Keyword query box 360, rather than the Data keyword query box 350.

6. Multiple Keywords

In an embodiment of this invention for which multiple keywords are included in keyword query 105, one alternative is to treat the keywords as a complete phrase: the proximity of the exact phrase to each NUT is used to score the relevance of the NUT. In addition, NLP parsers within Scoring Module 140 can be used to recognize the relationship of the multiple keywords within a sentence structure even if those multiple keywords are not sequential in the document. For example, in the sentences, "The height of the tree is 23 meters," or "The speed of the boat is 20 MPH," the NUTs can be associated with "tree height" and "boat speed", respectively, by Scoring Module 140. In further embodiments, complete Boolean relations between the keywords, including for example, OR, XOR, AND, can be integrated and considered in Scoring Module 140.

Alternatively, the keywords can be treated individually, and suggested units 160 can be determined for each keyword. In one embodiment, the combined score of units for each of the respective keywords can be used to determine a single set of top-scoring units for the query as a whole.

In a further embodiment, one or more keywords of query 105 may be designated and processed as document keywords (see Document Constraint section above), while another subset of the keywords may be designated and processed as contextual constraints for NUTs (data keywords) in the manner described generally in Section 1 and 2 above.

7. Facet Finding

In addition to automatically identifying a unit associated with the keyword query, a preferred embodiment of this invention also allows the user to identify the facets associated with that query and unit combination. For example, as shown in FIG. 3, a query for keyword "laser" may return "meters" as the automatically found base unit; then the data search is performed by Information Retrieval System 180 to retrieve data that is most relevant to that query keyword-unit combination. Once this data is returned, the most commonly occurring keywords within the source documents for the retrieved data are, preferably, automatically identified as potential facets; all other unit-finding scoring techniques discussed above (e.g., measuring proximity of keywords and units) can be used as well to identify potential facets. In the example shown in FIG. 3, the unit determined is meters, and the facets "wavelength" and "beam waist" are potential facets 330 that can be listed for the user. These facets typically reflect properties of the query keyword that can be described by the query/found unit. If there is only one dominant facet chosen, then it can be used as a label on the graph 310 to indicate the system's guess as to what property of the laser is being plotted in "meters." In another embodiment there could be multiple numeric clusters in the retrieved data and distinct facets could be identified for each cluster. When there are multiple facets that share a given base unit, numeric clusters can be leveraged to recognize the keywords representing each of the semantically unique facets. This relies on the fact that different numeric clusters often have different semantic meaning. For example, when laser is searched, "beam waist" and "wavelength" facets can be identified due to their different numeric scales and distributions even though they share a common base unit (although the exact form of unit expression would likely be in microns for "beam waist" and nm for "wavelength"). Thus the automated unit finding system described herein facilitates discovering the relevant facets. The user can interact with the Interface to alternatively select one of the facets 330 and constrain the results to only those data whose source documents share that facet.

In addition, different facets can be recommended for each of the suggested units 320. For example, "power" might be a facet for the unit Watt and "intensity" might be a facet for the unit "Watt/m^2."

Once facets have been determined by the unit finding system to be associated with a particular keyword query, they can be stored in the Look-up Table 170 for future use.

In another embodiment, a facet can be inferred from a NUT distribution even if the exact facet phrase is not present in the document. For example, if a NUT "532 nm laser" is retrieved then the facet "green wavelength" can be inferred as a relevant facet based on the numeric value and the distribution of other NUTs with similar metadata and local environments.

8. Structured Data

In its preferred embodiment, unit finding system 100 is capable of finding the most salient unit to associate with data relevant to a keyword query even with little or no additional structured data to provide external contextualization. However, this system can incorporate such external structured information, if available, to further improve the precision of Unit Finding system 100.

For example, if Index 110 has been constructed with contextual keyword tags on the numeric information, such as storing the description of price or length along with the number (or along with the NUT, depending on the structure of the index), then all numeric data with that tag can be retrieved in response to a query for a phrase associated with that tag regardless of spatial separation between a keyword phrase and the numeric data. In addition, if keyword query 105 contains words that have been previously associated with a hard-coded tag, including e.g. previously indentified facets for that query keyword, then only the NUTs or numeric data that are related to that tag will preferably be evaluated by Scoring Module 140. The NUTs containing units related to the tags may have one or more different base units and one or more different forms of the base unit and will be subsequently aggregated in Binning Module 150 as described previously. Alternatively, the suggested unit from Table 170 can be directly returned with Suggested Units 160.

In another embodiment, supervised learning can be used to assist the scoring procedure by using Look-up Table 170 which can contain more structured data beyond the relationships between different units and their corresponding conversions. For example, suppose a search for "green wavelength" is entered as query 105. First, Table 170 may store an entry that indicates that "wavelength" should be associated with the base unit "meter". This information can then be used in conjunction with corpus-defined associations to determine the suggested unit. In addition, the structured information can be of further use if Table 170 also stores numeric reference information for an entry of "green wavelength", e.g., "green wavelength" corresponds to a range of 400-600 nm. If the numerical value of a given NUT is outside of that reference definition, then that NUT's score as it contributes to unit finding can preferably be reduced. For example if a sentence in the corpus states "the focal point of the green wavelength laser was 50 microns," but Table 170 stores a rule that green wavelength is roughly 500 nm, then the reference to 50 microns would not be highly scored in contributing to the unit finding stage—even though microns and nanometers are both units of length. In this case, Unit Finding System 100 knows (via Table 170) that "green wavelength" refers to any length close to 500 nm, and therefore the "50 micron" NUT should not be highly scored. In this example, the data clustered around 50 microns would more likely be associated with the facet "focal point" and the data clustered around 500 nm would be more likely associated with the facet "wavelength."

In addition, once a keyword or multiple keywords have been identified to be associated with a single unit or a list of units these associations can be stored in a relational database within Table 170 to expedite the process for future searches. However, this data, which in turn becomes structured, hard-coded data is preferably only one component of the unit finding process. In this way, suggested units 160 are determined efficiently, but Unit Finding System 100 retains the ability to adapt and suggest new units as the database evolves and new associations emerge.

From the above discussion, many variations will be apparent to one skilled in the relevant art that would yet be encompassed by the spirit and scope of the invention. For example, in a particular application, practitioners might employ NLP or other techniques for scoring the relatedness of units and keywords within a document without measuring proximity per se, such as by measuring the extent to which a certain unit and keyword both frequently occur within the same documents and very rarely occur in the absence of each other. In general, the above description is intended to illustrate the operation of exemplary embodiments, and is not meant to limit the scope of the invention, which is to be limited only by the following claims.

What is claimed is:

1. A method using a computer system for automated retrieval of numeric information from a set of electronic source documents, comprising:
   receiving an electronic query comprising one or more keywords from a remote user computer system via a telecommunications network;
   accessing a computer-searchable index comprising a plurality of searchable index entries, at least a plurality of the entries each including a representation of an associated unit of measure extracted from the electronic source documents;
   automatically determining a query unit, at least partly by identifying one or more related occurrences within the electronic source documents of said one or more keywords and one or more of said units of measure and by scoring the one or more related occurrences to reflect how closely related each of said one or more keywords and one or more of said units of measure appear to be within the source document; and
   assessing the relevance of one or more of the index entries to the electronic query, at least partly based on a comparison of the query unit and the unit associated with one or more of said index entries.

2. The method of claim 1, wherein scoring the related occurrences employs one or more natural language processing techniques.

3. The method of claim 1, wherein scoring the related occurrences comprises calculating a measure of proximity between the keyword and the unit within text of the source document.

4. The method of claim 3, wherein the measure of proximity within the source document reflects one or more of: a number of words separating the unit and the keyword, and punctuation separating the unit and the keyword.

5. The method of claim 1, wherein automatically determining a query unit further comprises aggregating a plurality of scores assigned respectively to each of the related occurrences for said one or more units of measure.

6. The method of claim 5, wherein aggregating further comprises scaling the aggregation of said scores.

7. The method of claim 5, wherein aggregating further comprises combining a plurality of scores assigned to each of the related occurrences for two or more non-identical, but related, units of measure.

8. The method of claim 7, wherein determining a query unit further comprises selecting, as the query unit, the unit of measure with a highest individual score from among said two or more non-identical but related units of measure whose scores were combined.

9. The method of claim 1, wherein the electronic query further includes one or more document-level constraint keywords, and wherein said method does not assess proximity within the electronic source documents of said document-level constraint keywords and said units of measure in determining the query unit.

10. The method of claim 1, further including displaying graphical output based on the assessed relevance of the index entries to the electronic query.

11. The method of claim 10, wherein:
the graphical output includes an interactive facility listing one or more alternative suggested query units and allowing a user to select among the suggested query units, and
the method further includes assessing the relevance of the index entries based on comparison with the user-selected query unit, and displaying revised graphical output reflecting said assessment.

12. The method of claim 1, further including automatically determining one or more additional keywords related to said query, at least partly based on a frequency of occurrence of said additional keywords within the source documents corresponding to the index entries assessed as relevant to the query.

13. The method of claim 12, wherein one or more of said additional keywords is used to further assess the relevance of said index entries.

14. The method of claim 1, wherein each of the index entries represents an item of numerical data comprising a unit of measure and a numerical value, said items of numerical data extracted from the electronic source documents.

15. The method of claim 1, wherein the computer system comprises a plurality of distributed computers in communication with each other via a telecommunications network.

16. Apparatus for numeric information retrieval, comprising:
electronic memory storing a computer-searchable index, the index comprising a plurality of searchable index entries, at least a plurality of the entries each including a representation of an associated unit of measure extracted from the electronic source documents;
a computer system, being programmed to receive a query, said query comprising one or more keywords;
said computer system being further programmed to automatically generate a query unit, at least partly by determining a correlation within the electronic source documents between the keywords and one or more of the units included in the index, wherein determining the correlation includes scoring how closely related each of said one or more keywords and one or more of said units appear to be within the electronic source documents; and
said computer system being further programmed to assess the relevance of one or more of the index entries to the query, based at least partly on a comparison of the query unit and the unit associated with each of said index entries.

17. The apparatus of claim 16, wherein scoring comprises calculating a measure of proximity between the keyword and the unit within text of the source document.

18. The apparatus of claim 16, wherein the electronic query further includes one or more document-level constraint keywords, and wherein said computer system is not programmed to asses proximity within the electronic source documents of said document-level constraint keywords and said units of measure in generating the query unit.

19. The apparatus of claim 16, said computer system being further programmed to display interactive graphical output based on the assessed relevance of the index queries to the electronic query, and wherein said interactive graphical output includes one or more alternative suggested query units and allows a user to select among the suggested query units.

20. The apparatus of claim 16, said computer system being further programmed to automatically determine one or more additional keywords related to said query, at least partly based on a frequency of occurrence of said additional keywords within the source documents corresponding to the index entries assessed as relevant to the query.

21. The apparatus of claim 16, wherein each of the index entries represents an item of numerical data comprising a unit of measure and a numerical value, said items of numerical data extracted from the electronic source documents.

22. The apparatus of claim 16, wherein the computer system comprises a plurality of computers in communication with each other via a telecommunications network.

* * * * *